United States Patent [19]
Bell, III

[11] Patent Number: 5,531,508
[45] Date of Patent: Jul. 2, 1996

[54] HEAVY CONSTRUCTION EQUIPMENT TIRE GUARD

[76] Inventor: Randall R. Bell, III, 4135 Baisden Dr., Pensacola, Fla. 32503

[21] Appl. No.: 424,970

[22] Filed: Apr. 19, 1995

[51] Int. Cl.$^6$ .................................................... B60B 7/06
[52] U.S. Cl. .................................... 301/37.23; 301/37.35; 301/37.37
[58] Field of Search ................................ 301/37.1, 37.23, 301/37.35, 37.36, 37.31, 37.32, 37.37

[56] References Cited

U.S. PATENT DOCUMENTS

| | | | |
|---|---|---|---|
| 2,178,592 | 11/1939 | Lincoln | 152/208 |
| 2,209,967 | 8/1940 | Golod | 301/39 |
| 2,488,864 | 11/1949 | Handy | 152/410 |
| 2,937,904 | 5/1960 | Barnes | 301/37.23 |
| 4,235,271 | 11/1980 | Olsen et al. | 152/186 |
| 4,533,183 | 8/1985 | Gant | 301/37.23 |
| 4,790,362 | 12/1988 | Price | 152/153 |
| 4,889,394 | 12/1989 | Ruspa | 301/37.1 X |
| 5,135,289 | 8/1992 | Fleck et al. | 301/37.1 |

FOREIGN PATENT DOCUMENTS

| | | | |
|---|---|---|---|
| 1172247 | 2/1959 | France | 301/37.23 |
| 3631489 | 3/1988 | Germany | 301/37.23 |

*Primary Examiner*—Russell D. Stormer
*Attorney, Agent, or Firm*—Jacobson, Price, Holman & Stern

[57] ABSTRACT

A rigid but slightly flexive circular guard plate is provided and mounted from the outer rim portion of a vehicle wheel having a pneumatic tire mounted thereon, the guard plate at least closely opposing the outer side wall of the associated tire and being mounted from the wheel outer rim portion solely through the use of mounting structure carried by the plate and independent of any secured mounting on the associated vehicle wheel.

2 Claims, 2 Drawing Sheets

HEAVY CONSTRUCTION EQUIPMENT TIRE GUARD

BACKGROUND OF THE INVENTION

1. Field of the Invention

This invention relates to a circular plate-like guard removably mountable on the outer side of a support wheel of heavy construction equipment with the circular plate disposed in concentric relation with the wheel, spaced only slightly outward of the outer side of the wheel and with the diameter of the plate being only slightly less than the diameter of the associated pneumatic tire when inflated. The plate protects the outer side wall of the tire against injury from sharp ground objects such as rocks and scrap metal and also protects the tire outer side wall from injury by contact with curbing, etc.

2. Description of Related Art

Various different forms of tire guards and other similar structures heretofore have been provided such as those disclosed in U.S. Pat. Nos. 2,178,592, 2,209,967, 2,488,864, 4,235,271 and 4,790,362. However, these previously known devices are either semipermanently mounted from an associated wheel, mounted to the associated wheel through the use of one of the tire bead retaining flanges thereof or mounted from an associated wheel by structure requiring each circular plate-like guard to be specifically manufactured for support from a particular wheel. In addition, most previously known forms of tire guard plates are manufactured for use in conjunction with only a single size wheel.

SUMMARY OF THE INVENTION

The tire guard plate of the instant invention is constructed so as to be readily mounted upon and demounted from an associated vehicle wheel. In this manner, a pneumatic tired construction vehicle may be transported from a storage yard to a location adjacent a job site over conventional paved roadways without hinderance from tire guard plates. After reaching the vicinity of a job site the vehicle may be stopped and the wheels thereof may be quickly provided with tire guards before the vehicle travels off paved roadways and into an off road job site. Furthermore, at days end the vehicle may be driven, with the tire guard plates still mounted thereon from the job site to adjacent paved roadways and the tire guard plates may then be quickly removed and the construction vehicle may then proceed normally over paved roadways back to the storage yard. Of course, there are many other similar situations in which readily removable tire guard plates are desirable.

The tire guard plate of the instant invention includes mounting structure by which the plate may be mounted from a conventional type of construction vehicle wheel equipped with a substantially cylindrical outer rim portion and wherein a given plate actually may be effectively mounted upon rim portions of slightly different diameters. In some instances a greater diameter tire rim is provided with a balloon-type tire of substantially the same outside diameter as a narrower, stiffer side wall tire mounted upon a slightly smaller diameter wheel. In such instance, the same outside diameter tire guard plate of the instant invention may be readily mounted upon either different diameter rim.

The main object of this invention is to provide an effective tire side wall guard plate for use on heavy construction equipment as well as other wheeled vehicles which occasionally must be engaged in off road use or driven around a supply yard or the like as well as in other environments where vehicle tire outer side walls are exposed for injury by sharp or immobile ground projections.

Another object of this invention is to provide a tire side wall guard plate including mounting structure requiring only that the outer rim portion of the associated vehicle wheel be provided with a reasonably constant diameter and generally cylindrical inner surface.

Yet another very important object of this invention is to provide a vehicle tire side wall guard plate whose mounting structure is carried only by the guard plate itself and is adaptable for mounting the guard plate on vehicle wheels having slightly different diameter outer rim portions.

A further object of this invention is to provide a vehicle tire side wall protector including mounting structure therefore which automatically positions the circular guard plate in coaxial relation with the associated vehicle wheel while simultaneously drawing the guard plate inwardly toward the outer side of the associated wheel rim portion.

Another object of this invention is to provide a circular guard plate for a vehicle tire outer side wall and with the guard plate including mounting structure which may function, if desired, to actually inwardly deflect the mid-side wall portion of the associated tire outer side wall, this being in conjunction with mounting structure enabling ready removable of the guard plate to thereby prevent outer tire side wall chaffing during transient of the associated vehicle between a storage yard and a job site.

A final object of this invention to be specifically enumerated herein is to provide a heavy construction equipment tire guard in accordance with the preceding objects and which will conform to conventional forms of manufacture, be of simple construction and easy to use so as to provide a device that will be economically feasible, long lasting and relatively trouble free in operation.

These together with other objects and advantages which will become subsequentially apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
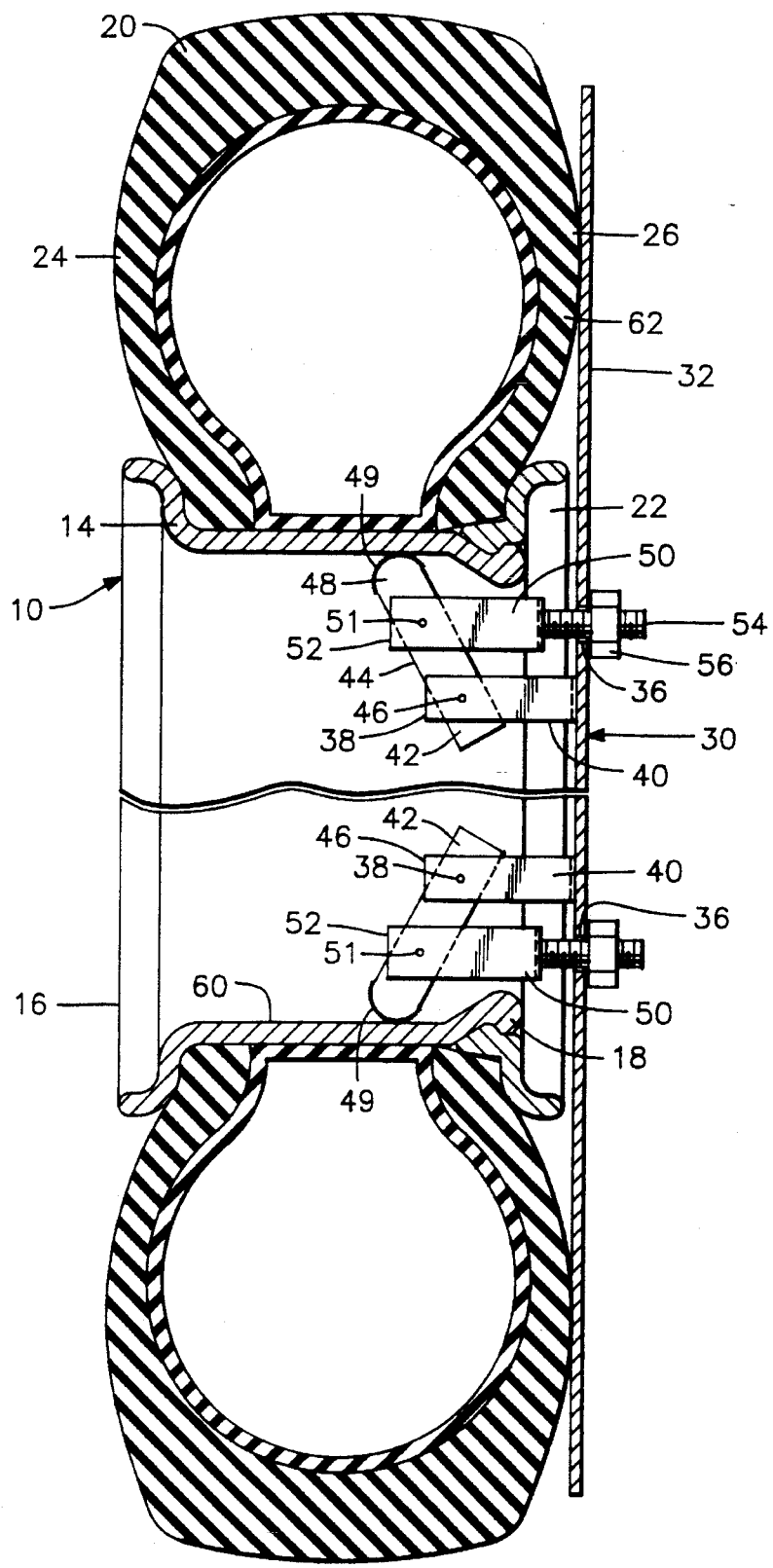
FIG. 1 is a fragmentary diametric sectional view of a typical heavy equipment vehicle wheel outer rim portion and a pneumatic tire mounted thereon and with a tire side wall guard constructed in accordance with the present invention mounted upon the outer side of the wheel rim, the center hub portion of the wheel being broken away.
Figure 2:
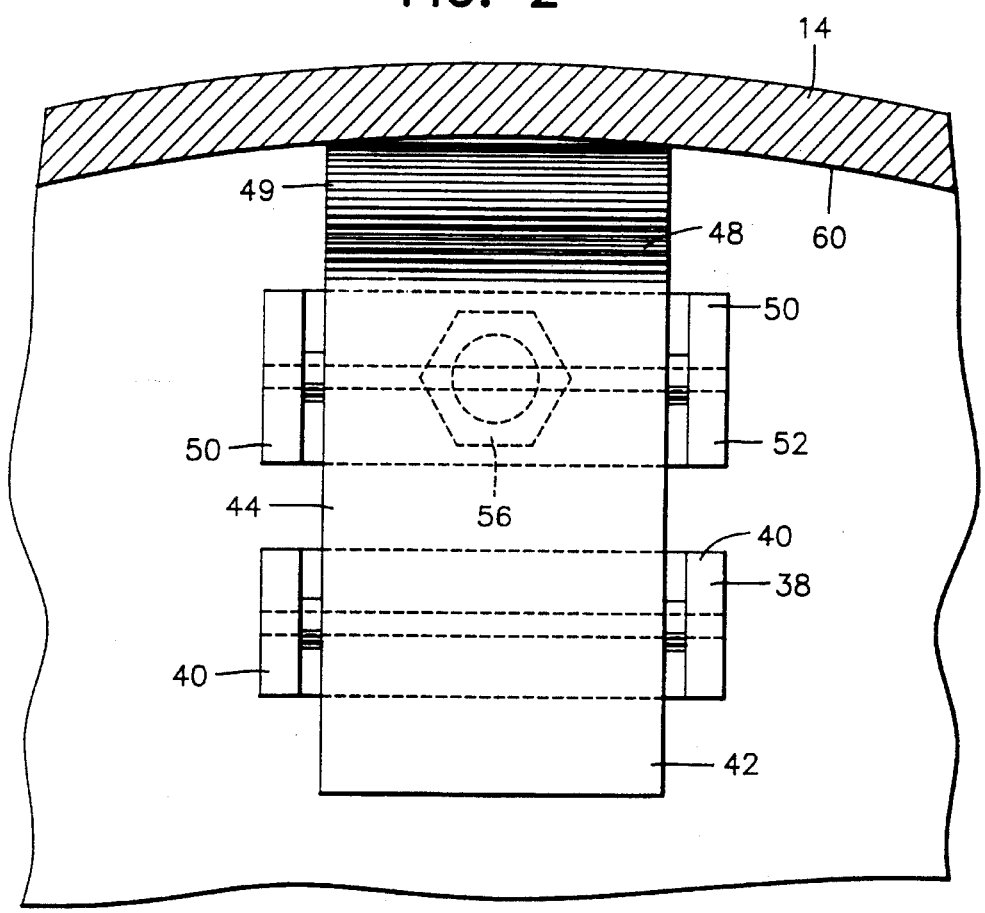
FIG. 2 is an enlarged fragmentary sectional view of one of the mounting structures of the guard plate and the adjacent wheel outer rim portion.
Figure 3:
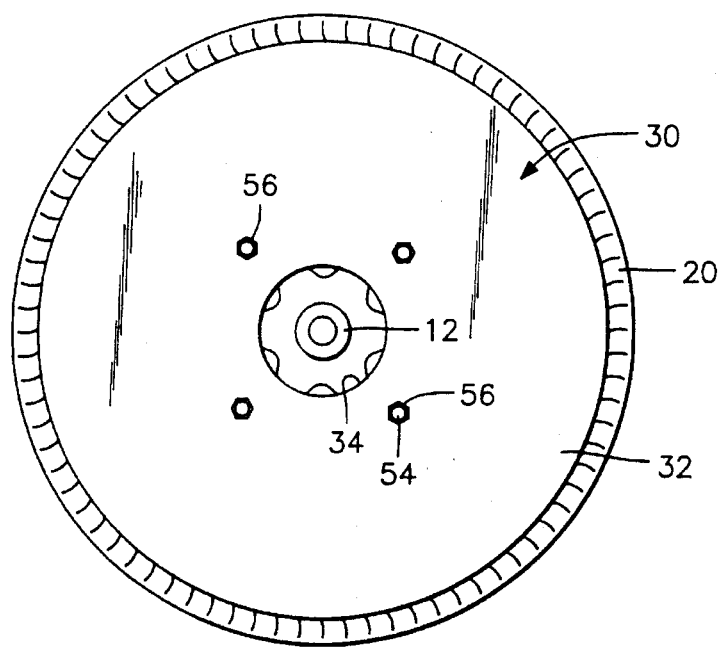
FIG. 3 is an outer side elevational view of the guard plate as applied to an associated vehicle wheel and tire.

Referring now more specifically to the drawings the numeral 10 generally designates a vehicle wheel including a center hub portion 12 and an outer substantially cylindrical rim portion 14. The rim portion 14 includes inner and outer ends 16 and 18 and a pneumatic tire 20 is mounted upon the outer rim portion 14 and held thereon by a conventional split ring 22, the tire 20 including inner and outer side wall portions 24 and 26.

When the wheel 10 is mounted upon heavy construction equipment or the like to be moved around a supply yard in which there be sharp or rigid ground obstructions, the outer side wall portion 26 is subject to punctures and or severe bruising by such obstructions. In addition, if the associated heavy equipment must be transported to and from an off road construction site, the outer side walls of the tires of such heavy equipment are subject to punctures and bruises at the off road work site.

Accordingly, a need exists for structure by which the outer side walls of pneumatic tires supporting heavy construction equipment may be protected against puncture and bruising.

The tire guard of the instant invention is referred to in general by the reference numeral 30 and includes a heavy gauge, rigid, but somewhat flexive, metal plate 32 which is circular in plan shape and includes a central opening 34 formed therein. The plate is of a diameter slightly less than the outside diameter of the tire 20 (when the latter is properly inflated) and the inner peripheral portion of the plate 32 includes four equally circumferentially spaced openings 36 formed therein (3, 5, 6 or more openings 36 may be provided, if desired depending upon the diameter of the outer rim portion 14).

The plate 32, radially inwardly of each opening 36, includes a fixed U-shaped mounting bracket 38 between whose laterally spaced arms 40 one end 42 of an elongated clamping bar 44 is pivotally supported as at 46.

The other end 48 of each clamping bar 44 is rounded and serrated at 49 and pivotally secured between the laterally spaced arms 50 of a second, movable U-shaped bracket 52, as at 51, anchored relative to the head end of a threaded bolt 54 projecting outwardly through the associated opening 36 from the inner side thereof, the outer end of the bolt 54 having a threaded nut 56 threaded thereon outwardly of the plate 32.

When the nuts 56 are backed off to the outer ends of the bolts 54, the U-shaped brackets 52 may be inwardly displaced relative to the inner side of the plate 32 sufficiently to swing the ends 48 of the clamping bars 44 radially inwardly a sufficient amount such that the plate 32 may be shifted axially outwardly of the outer end 18 of the outer rim portion 14 to remove the plate 32 from the wheel 10.

However, when the plate 32 is to be mounted to the wheel 10, the plate 32 is first positioned in generally the same manner illustrated in FIG. 1 but with the nuts 56 backed off to the outer ends of the bolts 54. Then, the nuts 56 may be tightened in order to draw the U-shaped brackets 52 outwardly toward the inner side of the plate 32 and to swing the second rounded and serrated ends 48 of the clamping bars 44 outwardly into engagement with the substantially cylindrical inner surface 60 of the outer rim portion 14. As the rounded and serrated ends 48 engage the inner surface 60 of the outer rim portion 14, the plate 32 is shifted into substantial coaxial relation with the outer rim portion 14 and the rounded and serrated ends 48 bite into the inner surface 60 and cause the plate 32 to be drawn inwardly toward the outer end 18 of the outer rim portion 14. If desired, initial placement of the plate 32 relative to the tire 20 may be such that when the nuts 56 are tightened the plate 32 is actually drawn into contact with the outer side wall portion 26 to slightly inwardly deflect the latter for contact of the plate 32 with the split ring 22.

Because of the fact that the mounting means for the plate 32 consisting of the U-shaped brackets 38 and 52 as well as the clamping bars 44 are supported solely from the plate 32, the plate 32 may be mounted on substantially all wheels similar to the wheel 10 and including a generally cylindrical inner surface corresponding to the surface 60. Further, because of the aforementioned mounting means, the plate 32 may be mounted upon outer rim portions of slightly different diameters.

When the plate 32 of the guard 30 is mounted in the manner illustrated in FIG. 1, the outer periphery of the tire 20 is still capable of flexing to compensate for minor ground obstructions, but the plate 32 fully covers and thus protects the outer side mid-side wall portion 62 of the tire 20 against damage by sharp or fixed ground obstructions. Furthermore, inasmuch as the guard 30 may be readily mounted upon the wheel 10 or removed therefrom in a rapid manner independent of structure used to mount the wheel 10 on an associated vehicle or the structure utilized to mount the tire 20 on the outer rim portion 14, the tire guard 30 may be readily removed for movement of the associated vehicle to and from a job site over paved roadways. As such vehicle reaches an off road site, however, the tire guard 30 is applied and has been found to greatly reduce pneumatic tire failures of heavy equipment vehicles at off road sites and other types of vehicles confined to movement through a supply yard or the like.

The foregoing is considered as illustrative only of the principles of the invention. Further, since numerous other modifications and changes readily will occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination, a vehicle wheel including an outer rim portion having inner and outer ends and a generally cylindrical inner rim surface, said outer rim portion including an outer circumference upon which a pneumatic tire is mounted, said tire, when inflated, projecting a predetermined radial extent beyond said outer rim portion, a tire side wall protector including a substantially circular plate, mounting means readily removably mounting said plate from said rim portion outwardly of said outer end and in substantially concentric relation with said wheel and tire, said plate being disposed at least closely adjacent and outwardly of said outer end and projecting radially outwardly beyond said outer rim portion an extent slightly less than said predetermined radial extent, said plate including a plurality of openings formed therethrough and spaced generally equally about the center of said plate, said openings being spaced inwardly of said outer rim portion, said mounting means including a U-shaped bracket spaced radially inwardly of each of said openings and projecting inwardly from the inner side of said plate, a threaded bolt extending through each of said openings and supporting a second U-shaped bracket on the end thereof projecting inwardly of said plate, a threaded nut threaded on each of said bolts outwardly of the outer side of said plate and a clamping bar having its opposite ends pivotally supported from corresponding pairs of said brackets and extending generally radially of said outer rim portion, said clamp bars including outer ends engaged with said inner rim surface, said clamping bar outer ends being inwardly inclined away from the inner side of said plate so that tightening of said nuts on said bolts will swing the clamping bar outer ends outwardly into tighter engagement with said inner rim surface and outwardly toward said clamp plate.

2. The combination of claim 1 wherein said plate is rigid, but somewhat flexive.

* * * * *